United States Patent [19]
Collins

[11] Patent Number: 6,120,081
[45] Date of Patent: Sep. 19, 2000

[54] FOLDABLE TAILGATE

[76] Inventor: Robert J. Collins, 12303 Fortson Rd., Jacksonville, Ak. 72076

[21] Appl. No.: 09/224,311

[22] Filed: Dec. 31, 1998

[51] Int. Cl.$^7$ .................................................. B62D 33/02
[52] U.S. Cl. ............................................. 296/61; 414/537
[58] Field of Search ....................... 296/61, 62; 292/121, 292/219; 414/537

[56] References Cited

U.S. PATENT DOCUMENTS

| | | | |
|---|---|---|---|
| 1,699,882 | 1/1929 | Ferguson | 414/537 |
| 2,603,529 | 7/1952 | Troth et al. | 414/537 X |
| 2,703,727 | 3/1955 | Vigmostad | 292/121 |
| 2,797,960 | 7/1957 | Endres et al. | 296/61 |
| 5,156,432 | 10/1992 | McCleary | 414/537 X |

*Primary Examiner*—Dennis H. Pedder

[57] ABSTRACT

A truck tailgate assembly is provided including an inboard portion adapted for being pivotally mounted on a rear edge of a truck. Also included is an intermediate portion being hingably mounted to the inboard portion. Next provided is an outboard portion which is hingably mounted to the intermediate portion. A locking assembly is adapted for maintaining the portions in stacked relationship while the truck is moving.

6 Claims, 3 Drawing Sheets

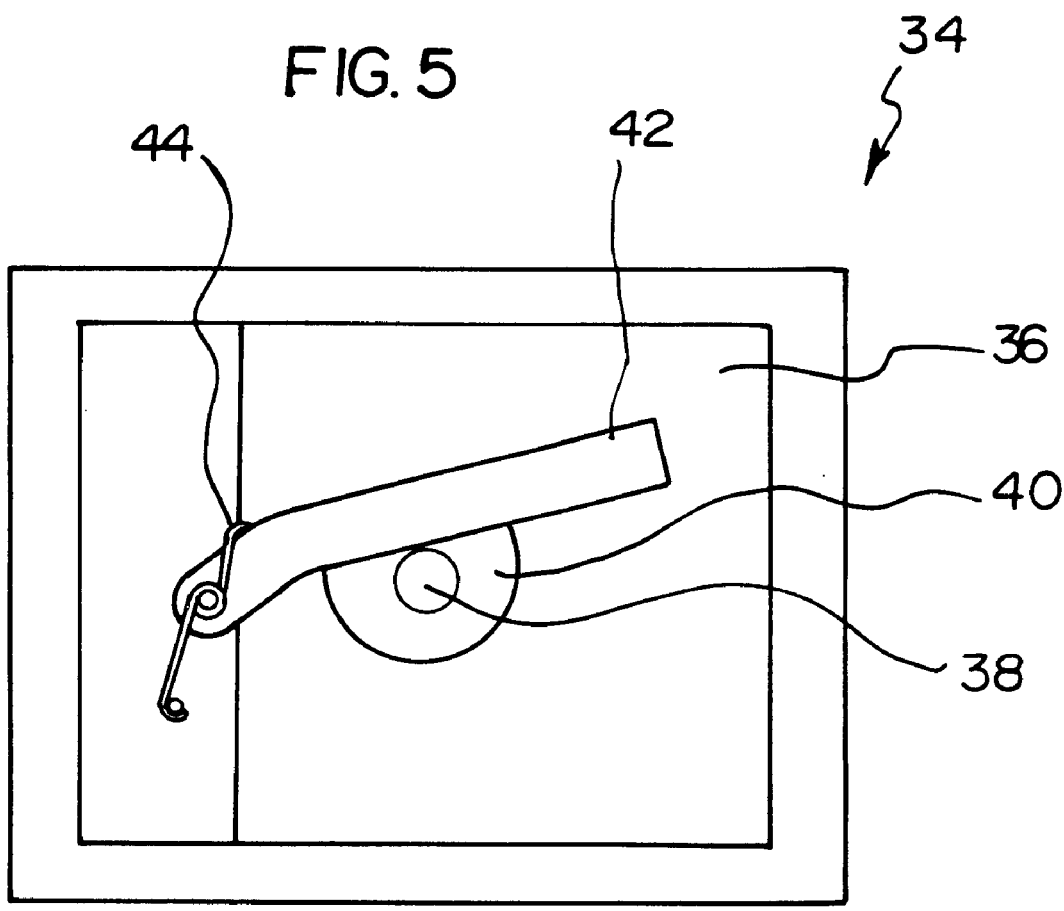

FOLDABLE TAILGATE

BACKGROUND OF THE INVENTION

1. Field of the Invention

The present invention relates to tailgates and more particularly pertains to a new foldable tailgate for providing a truck tailgate which may also be used to load the truck in a convenient fashion.

2. Description of the Prior Art

The use of tailgates is known in the prior art. More specifically, tailgates heretofore devised and utilized are known to consist basically of familiar, expected and obvious structural configurations, notwithstanding the myriad of designs encompassed by the crowded prior art which have been developed for the fulfillment of countless objectives and requirements.

Known prior art tailgates include U.S. Pat. No. 5,211,437; U.S. Pat. No. 5,273,335; U.S. Pat. No. 5,156,432; U.S. Pat. No. 4,735,454; U.S. Pat. Des. 338,760; and U.S. Pat. No. 5,312,148 which are incorporated herein by reference.

In these respects, the foldable tailgate according to the present invention substantially departs from the conventional concepts and designs of the prior art, and in so doing provides an apparatus primarily developed for the purpose of providing a truck tailgate which may also be used to load the truck in a convenient fashion.

SUMMARY OF THE INVENTION

In view of the foregoing disadvantages inherent in the known types of tailgates now present in the prior art, the present invention provides a new foldable tailgate construction wherein the same can be utilized for providing a truck tailgate which may also be used to load the truck in a convenient fashion.

The general purpose of the present invention, which will be described subsequently in greater detail, is to provide a new foldable tailgate apparatus and method which has many of the advantages of the tailgates mentioned heretofore and many novel features that result in a new foldable tailgate which is not anticipated, rendered obvious, suggested, or even implied by any of the prior art tailgates, either alone or in any combination thereof.

To attain this, the present invention generally comprises an inboard portion having a frame with a pair of elongated side bars and a plurality of short cross bars mounted between the side bars in perpendicular relationship therewith. The bars of the inboard portion include a wire mesh sheet mounted on opposite faces of the frame. As shown in FIG. 1, a first one of the side bars of the inboard portion is adapted for being pivotally mounted on a rear edge of a truck. The wire mesh sheet of the inboard portion has a rectangular cut out formed therein adjacent to the first one of the side bars at a central extent thereof. Next provided is an intermediate portion including a frame having a pair of elongated side bars with a plurality of short bars mounted therebetween in perpendicular relationship therewith. The bars of the intermediate portion include a wire mesh sheet mounted on opposite faces of the frame, similar to the inboard portion. A first one of the side bars of the intermediate portion is hingably mounted to a second one of the side bars of the inboard portion by way of hinges mounted on bottom faces thereof. The second one of the side bars of the inboard portion has a plurality of strips fixedly mounted on a top face thereof for abutting a top face of the intermediate portion when in coplanar relationship therewith. It should be noted such strips prevent over rotation of the intermediate portion with respect to the inboard portion. The wire mesh sheet of the intermediate portion has a rectangular cut out formed therein adjacent to a second one of the side bars at a central extent thereof. Also included is a pair of locking plungers each slidably mounted within outermost cross bars of the intermediate portion adjacent to the first one of the side bars thereof. The locking plungers are spring loaded such that the same have an unbiased extended orientation and a biased retracted orientation. In use, the locking plungers are adapted for releasably engaging the truck. Further included is an outboard portion having a frame with a pair of elongated side bars, a plurality of short bars mounted therebetween, and a wire mesh sheet similar to the remaining portions. A first one of the side bars of the outboard portion is hingably mounted to the second one of the side bars of the intermediate portion by way of hinges mounted on bottom faces thereof. The second one of the side bars of the intermediate portion has a plurality of strips fixedly mounted on a top face thereof for abutting a top face of the outboard portion when in coplanar relationship therewith. The wire mesh sheet of the outboard portion has a rectangular cut out formed therein adjacent to the first one of the side bars at a central extent thereof. To accommodate the hinges between the inboard portion and the intermediate portion when the portions are folded, the wire mesh sheet of the inboard portion has a pair of rectangular cut outs formed therein adjacent to ends of the second one of the side bars thereof. Finally, a locking assembly is provided including a plate mounted within the cut out of the inboard portion. A post is mounted on the plate and has a bulbous end. An arm is pivotally mounted to one of the cross bars of the intermediate portion and extends within the cut out thereof. Also included is a spring coupled between the arm and the cross bar to which the arm is mounted. In use, this spring is adapted for urging the arm into a locked orientation in engagement with the post when the portions are folded and the post extends through the cut outs of each of the portions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new foldable tailgate apparatus and method which has many of the advantages of the tailgates mentioned heretofore and many novel features that result in a new foldable tailgate which is not anticipated, rendered obvious, suggested, or even implied by any of the prior art tailgates, either alone or in any combination thereof.

It is another object of the present invention to provide a new foldable tailgate which may be easily and efficiently manufactured and marketed.

It is a further object of the present invention to provide a new foldable tailgate which is of a durable and reliable construction.

An even further object of the present invention is to provide a new foldable tailgate which is susceptible of a low cost of manufacture with regard to both materials and labor, and which accordingly is then susceptible of low prices of sale to the consuming public, thereby making such foldable tailgate economically available to the buying public.

Still another object of the present invention is to provide a new foldable tailgate for providing a truck tailgate which may also be used to load the truck in a convenient fashion.

Even still another object of the present invention is to provide a new foldable tailgate that includes an inboard portion adapted for being pivotally mounted on a rear edge of a truck. Also included is an intermediate portion being hingably mounted to the inboard portion. Next provided is an outboard portion which is hingably mounted to the intermediate portion. A locking assembly is adapted for maintaining the portions in stacked relationship while the truck is moving.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a detailed rear view of the locking assembly of the present invention.

DESCRIPTION OF THE PREFERRED EMBODIMENT

Figure 1:
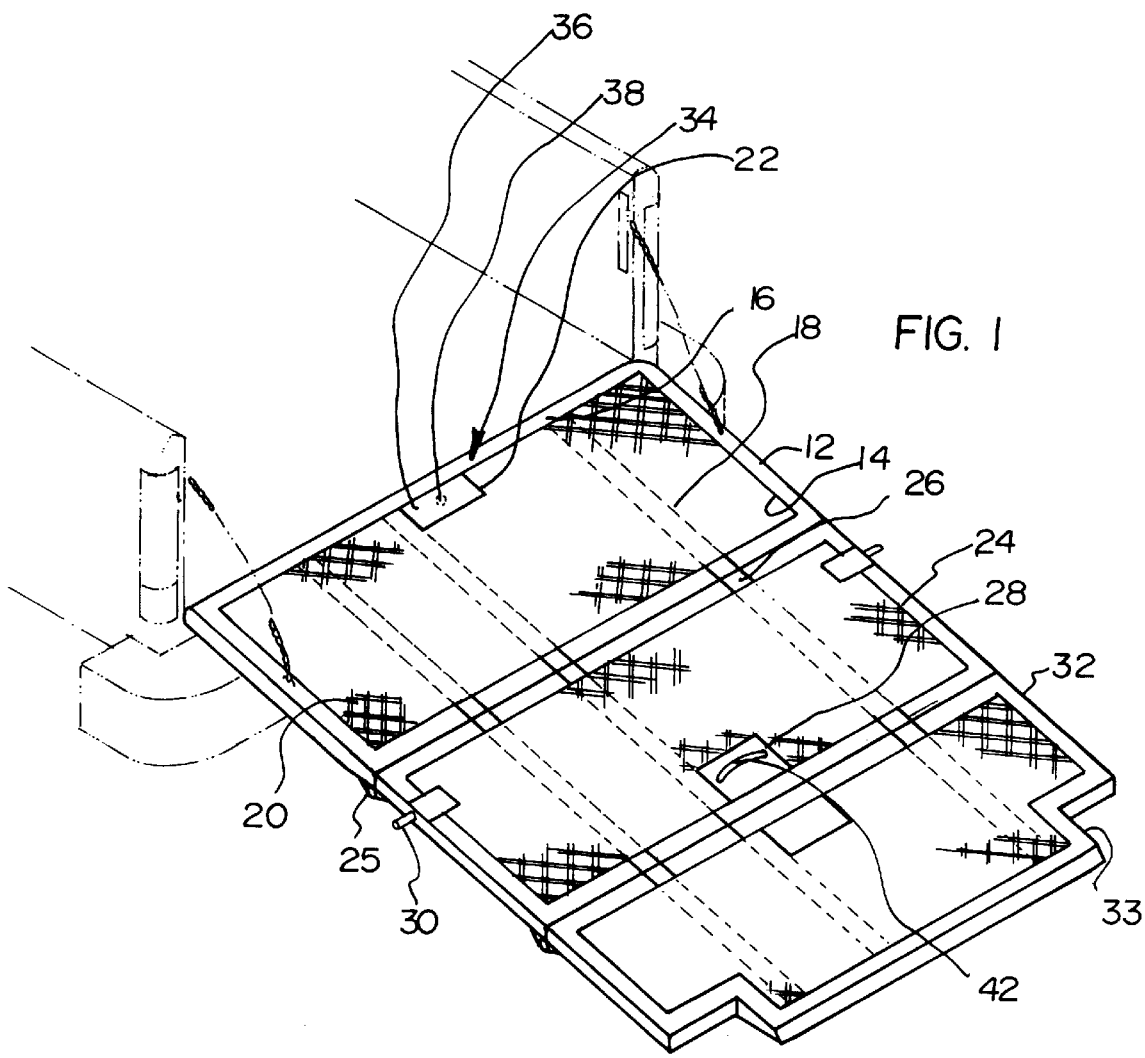
FIG. 1 is a perspective view of a new foldable tailgate according to the present invention.
Figure 2:
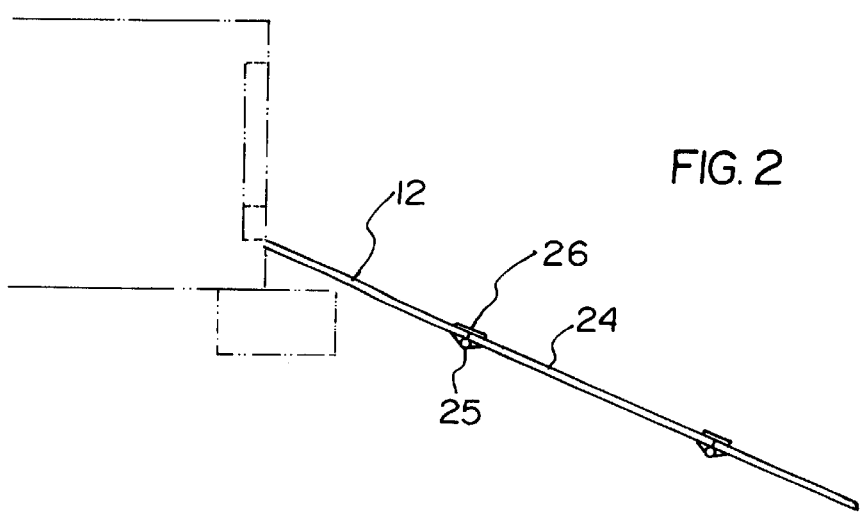
FIG. 2 is a side view of the present invention in an extended orientation.
Figure 3:
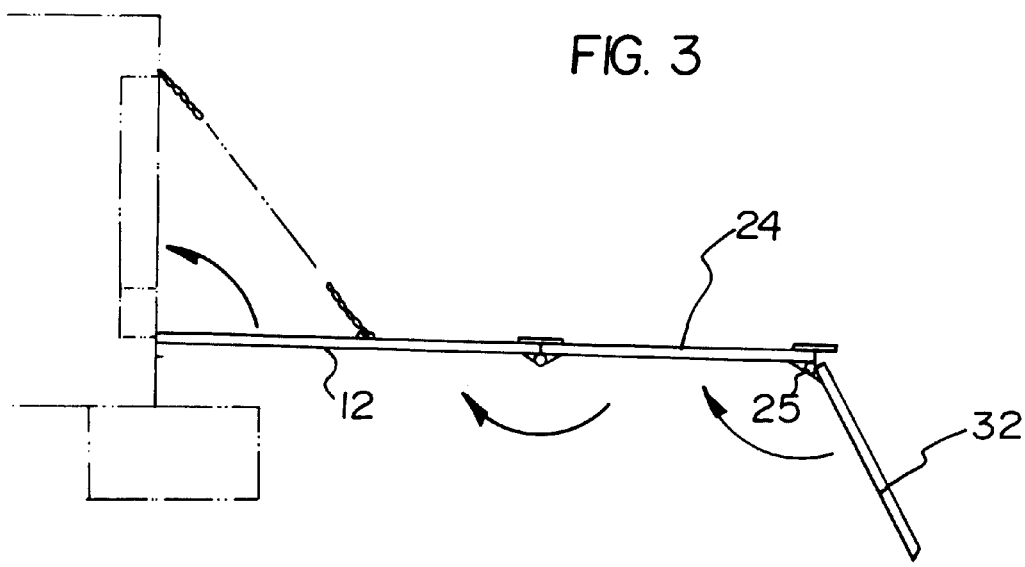
FIG. 3 is a side view of the present invention in a partially folded orientation.
Figure 4:
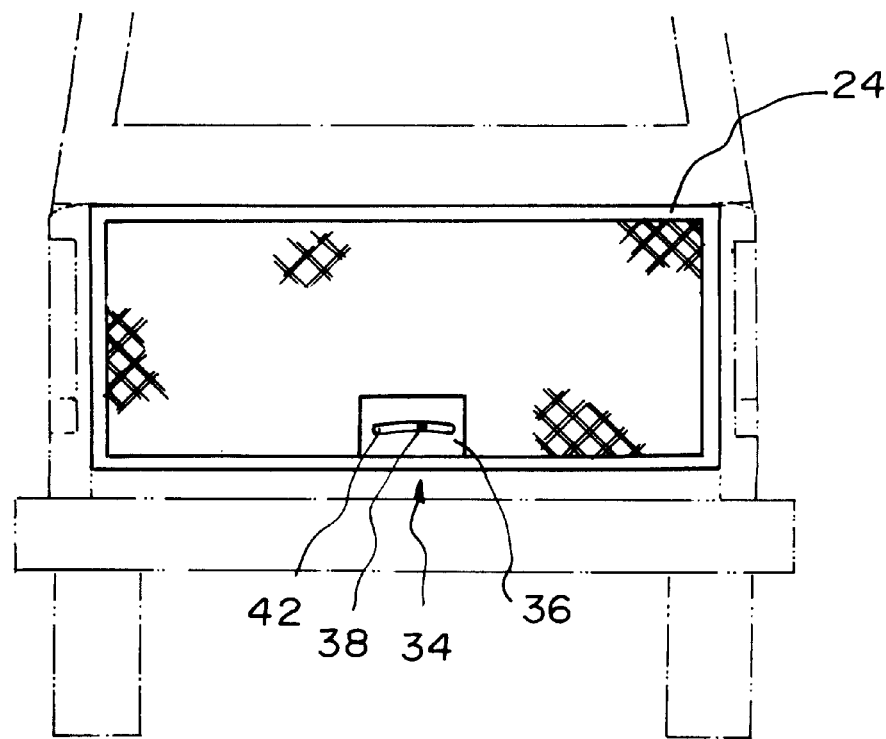
FIG. 4 is a rear view of the present invention.

With reference now to the drawings, and in particular to FIGS. 1 through 5 thereof, a new foldable tailgate embodying the principles and concepts of the present invention and generally designated by the reference numeral 10 will be described.

The present invention, designated as numeral 10, includes an inboard portion 12 having a frame 14 with a pair of elongated side bars 16 and a plurality of short cross bars 18 mounted between the side bars in perpendicular relationship therewith. The bars of the inboard portion include a wire mesh sheet 20 mounted on opposite faces of the frame. As shown in FIG. 1, a first one of the side bars of the inboard portion is adapted for being pivotally mounted on a rear edge of a truck. The wire mesh sheet of the inboard portion has a rectangular cut out 22 formed therein adjacent to the first one of the side bars at a central extent thereof.

Next provided is an intermediate portion 24 including a frame having a pair of elongated side bars with a plurality of short bars mounted therebetween in perpendicular relationship therewith. The bars of the intermediate portion include a wire mesh sheet mounted on opposite faces of the frame, similar to the inboard portion. A first one of the side bars of the intermediate portion is hingably mounted to a second one of the side bars of the inboard portion by way of hinges 25 mounted on bottom faces thereof. The second one of the side bars of the inboard portion has a plurality of strips 26 fixedly mounted on a top face thereof for abutting a top face of the intermediate portion when in coplanar relationship therewith. It should be noted such strips prevent over rotation of the intermediate portion with respect to the inboard portion. The wire mesh sheet of the intermediate portion has a rectangular cut out 28 formed therein adjacent to a second one of the side bars at a central extent thereof.

Also included is a pair of locking plungers 30 each slidably mounted within outermost cross bars of the intermediate portion adjacent to the first one of the side bars thereof. The locking plungers are spring loaded such that the same have an unbiased extended orientation and a biased retracted orientation. In use, the locking plungers are adapted for releasably engaging the truck. As an option, the locking plungers may be controlled by a handle positioned at a central extent of the intermediate portion by conventional interconnection means.

Further included is an outboard portion 32 having a frame with a pair of elongated side bars, a plurality of short bars mounted therebetween, and a wire mesh sheet similar to the remaining portions. A first one of the side bars of the outboard portion is hingably mounted to the second one of the side bars of the intermediate portion by way of hinges mounted on bottom faces thereof. The second one of the side bars of the intermediate portion has a plurality of strips fixedly mounted on a top face thereof for abutting a top face of the outboard portion when in coplanar relationship therewith. The wire mesh sheet of the outboard portion has a rectangular cut out formed therein adjacent to the first one of the side bars at a central extent thereof. To accommodate the hinges between the inboard portion and the intermediate portion when the portions are folded, the wire mesh sheet of the inboard portion has a pair of rectangular cut outs 33 formed therein adjacent to ends of the second one of the side bars thereof.

Finally, a locking assembly 34 is provided including a plate 36 mounted within the cut out of the inboard portion. A post 38 is mounted on the plate and has a bulbous end 40. An arcuate arm 42 is pivotally mounted to one of the cross bars of the intermediate portion and extends within the cut out thereof. Also included is a spring 44 coupled between the arm and the cross bar to which the arm is mounted. In use, this spring is adapted for urging the arm into a locked orientation in engagement with the post when the portions are folded and the post extends through the cut outs of each of the portions. As shown in FIG. 5, the spring has a central extent pivoting coincidentally with the arm and a pair of members connected to the arm and the associated cross bar to accomplish the intended function, as set forth hereinabove.

When closed and retracted, the outboard portion is positioned between the intermediate portion and the inboard portion. As such, the pair of end cut outs of the outboard portion are critical for accommodating the hinges which couple the inboard portion and the intermediate portion. Further, the outboard portion is preferably of a reduced thickness with respect to the remaining portions to allow the aforementioned folding feature. As an option, slots, beveled edges and the like may be positioned where needed to further accommodate the folding of the portions.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A truck tailgate assembly comprising, in combination:
   an inboard portion including a frame having a pair of elongated side bars with a plurality of short cross bars mounted therebetween in perpendicular relationship therewith, wherein the inboard portion includes a wire mesh sheet mounted across a face of the frame, a first one of the side bars being pivotally mountable on a rear edge of a truck, the wire mesh sheet of the inboard portion having a rectangular cut out formed therein adjacent to the first one of the side bars at a central extent of the inboard portion;
   an intermediate portion including a frame having a pair of elongated side bars with a plurality of short bars mounted therebetween in perpendicular relationship therewith, wherein the intermediate portion includes a wire mesh sheet mounted across a face of the frame, a first one of the side bars of the intermediate portion being hingably mounted to a second one of the side bars of the inboard portion by the way of hinges mounted on the bottom faces thereof, wherein the second one of the side bars of the inboard portion has a plurality of strips fixedly mounted on a top face thereof for abutting a top face of the intermediate portion when in coplanar relationship therewith, the wire mesh sheet of the intermediate portion having a rectangular cut out formed therein adjacent to a second one of the side bars of the intermediate portion at a central extent of the intermediate portion, the cut out of the intermediate portion being alignable with the cut out of the inboard portion when the intermediate and inboard portions are pivoted into an adjacent condition;
   a pair of locking plungers each being slidably mounted in outermost cross bars of the intermediate portion adjacent to the first one of the side bars thereof, the locking plungers having an extended orientation and a retracted orientation, wherein the locking plungers are adapted for releasably engaging the truck;
   an outboard portion including a frame having a pair of elongated side bars with a plurality of short bars mounted therebetween in perpendicular relationship therewith, wherein the bars of the outboard portion include a wire mesh sheet mounted on opposite faces of the frame, a first one of the side bars of the outboard portion being hingably mounted to the second one of the side bars of the intermediate portion by way of hinges mounted on bottom faces thereof, wherein the second one of the side bars of the intermediate portion has a plurality of strips fixedly mounted on a top face thereof for abutting a top of the outboard portion when in coplanar relationship therewith, the wire mesh sheet of the outboard portion having a rectangular cut out formed therein adjacent to the first one of the side bars of the outboard portion at a central extent of the outboard portion, the cut out of the outboard portion being alienable with the cut out of the inboard portion and the intermediate portion when the outboard, intermediate and inboard portions are pivoted into an adjacent condition, wherein the wire mesh sheet of the outboard portion has a pair of rectangular cut outs formed therein adjacent to ends of the second one of the side bars thereof; and
   a locking assembly including a plate mounted in the cut out of the inboard portion with a post mounted thereon having a bulbous end, an arm pivotally mounted to one of the cross bars of the intermediate portion and extending in the cut out of the intermediate portion, a spring being coupled between the arm and the cross bar to which the arm is mounted for urging the arm into a locked orientation in engagement with the post when the portions are folded into the adjacent condition and the post extends through the aligned cut outs of each of the portions.

2. A truck tailgate assembly comprising:
   an inboard portion for being pivotally mounted on a rear edge of a truck, the inboard portion having an opening therethrough;
   an intermediate portion being pivotally mounted to the inboard portion, the intermediate portion having an opening therethrough, the opening of the intermediate portion being alignable with the opening of the inboard portion when the inboard and intermediate portions are pivoted into an adjacent condition;
   an outboard portion being pivotally mounted to the intermediate portion, the outboard portion having an opening therethrough, the opening of the outboard portion being alignable with the opening of the inboard and intermediate portions when the inboard, intermediate and outboard portions are pivoted into an adjacent condition; and
   a locking assembly for maintaining the portions in stacked relationship during storage, the locking assembly being mounted in the opening of the inboard portion;
   wherein the locking assembly in the opening of the inboard portion is actuatable through the aligned openings in the intermediate portion and the outboard portion when the portions are pivoted into the adjacent condition.

3. A truck tailgate assembly as set forth in claim 2 wherein the locking assembly includes a post mounted on one of the portions and an arm pivotally mounted on another one of the portions which is adapted to engage the post through the openings in the portions.

4. A truck tailgate assembly as set forth in claim 2 wherein the intermediate portion includes a pair of locking plungers adapted for engaging the truck.

5. A truck tailgate assembly as set forth in claim 2 wherein the outboard portion includes a pair of cut outs formed in ends thereof for accommodating hinges which couple the intermediate portion and the inboard portion.

6. A truck tailgate assembly as set forth in claim 2 wherein the outboard portion is positioned between the intermediate portion and the inboard portion when the tailgate assembly is closed and retracted.

* * * * *